United States Patent [19]

Maerfeld

[11] 3,882,430

[45] May 6, 1975

[54] SURFACE ACOUSTIC WAVE DEVICES

[75] Inventor: Charles Maerfeld, Paris, France

[73] Assignee: Thomson-CSF, Paris, France

[22] Filed: June 25, 1974

[21] Appl. No.: 482,848

[30] Foreign Application Priority Data

June 29, 1973 France .............................. 73.23999

[52] U.S. Cl. .................. 333/30 R; 310/8.1; 310/9.8; 333/72

[51] Int. Cl. ........ H03h 9/26; H03h 9/30; H01v 7/00

[58] Field of Search .............. 333/30 R, 72; 310/8.1, 310/8.2, 9.7, 9.8

[56] References Cited

UNITED STATES PATENTS 3,836,876 9/1974 Marshall et al. ...................... 333/72

*Primary Examiner*—James W. Lawrence
*Assistant Examiner*—Marvin Nussbaum
*Attorney, Agent, or Firm*—Roland Plottel, Esq.

[57] ABSTRACT

The surface acoustic wave devices of the invention utilise the reflection of acoustic waves at gratings of irregularly spaced discontinuities, said devices comprising between an input (3) and an output (4) transducer, and gratings (2) of discontinuities, 3 dB directional couplers (5) separating the incident acoustic waves from the delayed reflected acoustic waves and making it possible to create dispersive delay lines and band-pass filters.

7 Claims, 3 Drawing Figures

SURFACE ACOUSTIC WAVE DEVICES

The present invention relates to surface acoustic wave devices comprising a dispersive grating constituted by irregularly spaced surface discontinuities and imparting to the waves which it reflects, a delay which is a function of their frequencies. The invention relates more particularly to a novel method of injecting the wave into such devices, which makes it possible to simply and effectively separate the incident wave from the delayed wave, whilst utilising a particularly simple structure in these devices.

The devices described in the present invention, comprise a block of piezo-electric material (or a block of some other material covered with a layer of piezo-electric material) capable of propagating surface acoustic waves generated in the piezo-electric material by an input transducer of comb-type for example. A grating of mechanical or electrical discontinuities, mutually parallel and capable of reflecting acoustic waves selectively as a function of their frequencies, is arranged on the piezo-electric material. These discontinuities are arranged in such a fashion that the spacing between two neighbouring discontinuities increases or decreases as one moves away from the transducer generating the acoustic wave in the device. The propagated acoustic wave is reflected at one or the other of these discontinuities, as a function of its frequency.

Dispersive delay lines utilising reflection at such discontinuities, are described for example in U.S. Pat. No. 3,400,341 filed in the United States on Mar. 8, 1966 and entitled "Elastic dispersive delay line."

In the delay lines disclosed in this patent, the discontinuities, which are mechanical discontinuities constituted by marks engraved on the line, are disposed perpendicularly in the direction of wave propagation. In this case, the incident wave and the reflected wave propagate along the same trajectory and the input transducer serves at the same time as an output transducer; in other words, this transducer receives the delayed, reflected acoustic wave and converts it to an electrical wave. This arrangement requires the use of an associated circulator, outside the delay line, to separate the incident electrical wave being delayed, from the delayed reflected wave. It is clear that this kind of arrangement considerably increases the bulk and weight of the delay line as well as the complexity of its operation.

It is well known to overcome this complication by separating the trajectories of the incident and reflected acoustic waves, on the delay line, each of them then being respectively emitted and received by a different transducer.

A method which enables this kind of separation to be achieved, is disclosed in the aforementioned American patent. It consists in arranging, as before, discontinuities perpendicular to the length of the delay line, but in this time supplying to these discontinuities a wave whose direction of propagation is inclined in relation to said discontinuities in order to produce an angle of incidence other than 90° and to achieve reflection which is symmetrical with the angle of incidence and not coincidental therewith.

Another method is described in an article by R. C. Williamson and Henry L. Smith entitled "Large-time-bandwith-product-surface-wave pulse compressor employing reflective gratings," published in "Electronic Letters" of Aug. 10, 1972, Volume 8, No. 16. This consists in using acoustic waves which propagate parallel to the length of the delay line but in having two identical discontinuity gratings arranged side by side on the line, the discontinuities in each of the gratings, which are parallel to one another, being symmetrically inclined in relation to the direction of propagation of the waves. The waves emitted by the input transducer towards the first grating, are reflected at right angles towards the second grating which again reflects them, again at right angles, towards an output transducer arranged on the line again in the neighbourhood of the input transducer.

The main drawback of these structures resides in the highly critical choice of the relative angles of inclination between the emission and reception channels and the discontinuities, this due to the anisotropic nature of the material used as the propagation medium.

According to the invention there is provided a surface acoustic wave device comprising a piezo-electric substrate for propagating acoustic waves, an input transducer for converting high frequency electrical waves into acoustic waves for propagating at the surface of said substrate, at least one dispersive grating of non-uniformly spaced discontinuities, and an output transducer for converting the acoustic waves when reflected by said grating, into electrical waves, said grating (2) discontinuities being disposed perpendicularly to the direction of propagation of said acoustic waves, said device further comprising at least one 3 dB coupler (5) of the type having regularly spaced parallel conductive strips arranged between said input (3) and output (4) transducers and said dispersive grating (2) said conductive strips of said coupler (5) being parallel to said discontinuities of said grating (2).

The function of separation between incident and reflected waves is achieved by the 3 dB coupler acting upon the acoustic waves themselves. The result is simplicity of structure whilst avoiding the need to utilise acoustic waves propagating in several directions along the grating.

Moreover, the structure of the devices in accordance with the invention makes it possible to create dispersive lines of long delay by combining, on one of the same substrate, several dispersive gratings along which the acoustic waves successively propagate. It also makes it possible to create band-pass filters.

Other objects, features and results of the invention will become apparent from the ensuing description given by way of non-limitative example and illustrated by the attached figures in which.

Figure 1:
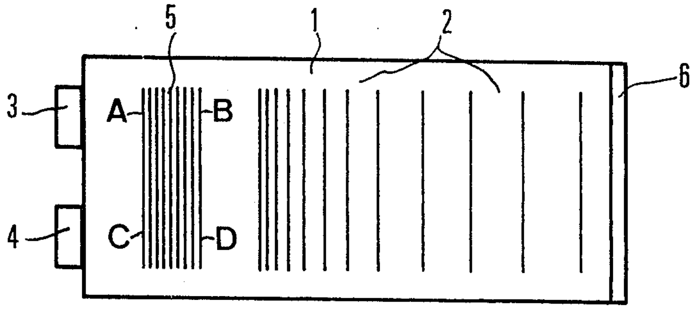
FIG. 1 is a schematic plan view of a device constituting a dispersive delay line.
Figure 2:
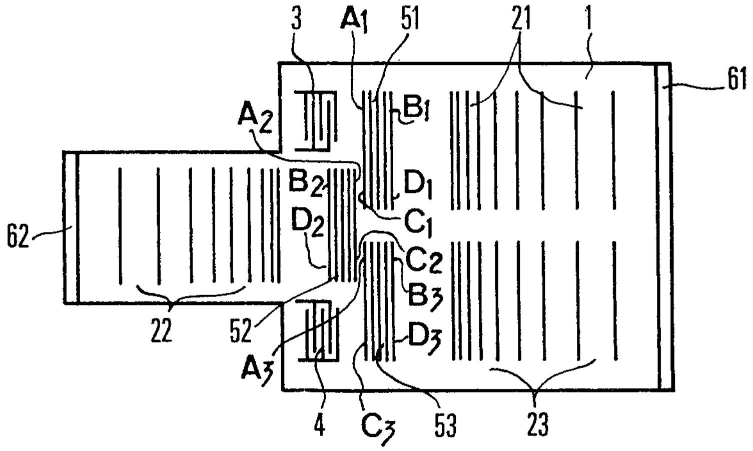
FIG. 2 is a schematic plan view of a variant embodiment which makes it possible to obtain a dispersive line of long delay.

FIG. 1 schematically illustrates in plan, a device which performs the function of a dispersive delay line. This line is made up of a substrate 1 of a piezo-electric material (or a substrate of a non-piezo-electric material covered with a layer of piezo-electric material) upon the surface of which there is arranged a grating 2 of discontinuities. These discontinuities can either be mechanical and therefore consist of marks engraved in the piezo-electric material, or electrical in which case they could consist of metal strips arranged on the surface of the piezo-electric material; the width of these discontinuities is not shown in the figure which is purely schematic in nature. The transducers 3 and 4, respectively emitter or input transducers and receiver or output transducers, are arranged at one end of the substrate on the piezo-electric material. In a manner known per se they can either be soldered to one face of the substrate 1, parallel to the discontinuities of the grating 2 as shown in FIG. 1, or again, may, as FIG. 2 shows (transducers 3 and 4), consist of metal interleaved comb strips deposited upon the surface of the substrate 1, the direction of the emitted acoustic wave, in both cases, being perpendicular to the discontinuities of the grating 2. In the example shown here, the spacing between the discontinuities of the grating 2 rises as a function of the distance of the emitter transducer 3 so that the generated acoustic wave is reflected by the grating 2 selectively as a function of its frequency, the trajectory which it follows, before being reflected, being the longer the lower its frequency. The reflected wave follows the reverse trajectory of the incident wave.

It goes without saying that the invention applies equally to devices in which the dispersive grating 2 is reversed in relation to that shown in FIG. 1, that is to say in which the spacing between the discontinuities decreases as one moves further away from the emitter transducer 3, the delay imparted to the acoustic waves then being the greater the higher their frequency.

The mechanism of differential reflection in accordance with wave frequency already being well known per se, it has not been described here nor have the values of the spaces between the grating discontinuities been quoted, these having been given for example in the aforesaid American patent.

An absorbant load of known type and schematically marked by the reference 6, is arranged at that end of the substrate 1 opposite to the end carrying the transducers 3 and 4, in order to absorb any acoustic waves not reflected by the grating 2.

In accordance with the invention, the dispersive delay line thus created comprises a directional coupler 5 with parallel conductive strips, arranged on the surface of the piezo-electric material 1, between the transducers 3 and 4, and the grating 2. A directional coupler of this kind is known per se; it is described in particular in French Pat. No. 72.15968 filed on May 4, 1972 and published under No. 2.135.303.

This patent describes various kinds of parallel directional couplers and in particular a 3 dB directional coupler. The delay line in accordance with the present invention incorporates this kind of 3 dB coupler.

The coupler 5, as schematically shown in FIG. 1, comprises parallel, regularly spaced conductive strips or bands arranged on the substrate 1, parallel to the discontinuities of the grating 2. The number of conductive strips making up the coupler as well as the spacing between the strips, are chosen on the one hand in order to transmit the band of acoustic frequencies being handled by the line, and on the other hand to create a 3 dB coupler.

Thus, the acoustic energy applied by the transducer 3 to the channel A of the coupler 5, is equally split between the two output channels B and D of the coupler. The wave produced by the channel D is, as in a conventional 3 dB coupler, delayed by $\pi/2$ in relation to the wave delivered by the channel B. These two waves propagate along the grating 2 where they are reflected and are recombined in the coupler 5, still in accordance with the law governing the operation of conventional 3 dB couplers. In other words, the two waves reflected and transmitted by the coupler 5 towards the channel A, are in antiphase whilst the two waves reflected and transmitted towards the channel C are in phase. All the reflected energy is thus directed by the coupler towards the receiver transducer 4.

It should be noted that the two incident waves produced by the channels B and D have a relative phase shift of $\pi/2$ over the whole length of their outward and return trajectory along the grating 2, so that if the discontinuities in this grating are of electrical type it is necessary to split the grating 2 into two separate parts corresponding in the one case to the wave produced by the channel B of the coupler 5 and in the other case to the wave produced by its channel D.

By way of example, in a delay line in accordance with the invention having a centre frequency of 200 MHz, made of lithium niobate and comprising interdigital transducers with five electrodes of a total width of 175 $\mu$m, as well as a dispersive grating with 6,000 electrodes, the 3 dB coupler utilised comprises 55 electrodes whose pitch is 7 $\mu$m. A line of this kind makes it possible to achieve a delay of 30 $\mu$s within a frequency band of 50 MHz.

The structures in accordance with the invention are particularly advantageous in the production of dispersive lines having long delays and a small size.

FIG. 2 illustrates schematically in plan, a delay line of this kind, producing a long delay, with which there are associated on one and the same piezo-electric substrate 1, several elementary delay lines through which the acoustic waves successively pass.

In the example illustrated here, three dispersive gratings 21, 22 and 23, advantageously identical, are arranged upon the substrate 1 and are associated with the input transducer 3 and the output transducer 4 through the medium of 3 dB directional couplers 51, 52, and 53. The acoustic wave furnished by the transducer 3 to the channel $A_1$ of the coupler 51 is applied, through the latter's output channels $B_1$ and $D_1$, to the grating 21 which reflects it towards the coupler 51. The channel $C_1$ of this coupler, which picks up all the energy reflected by the grating 21, in turn supplies the channel $A_2$ of the coupler 52. The coupler 52, through its output channels $B_2$ and $D_2$ supplies the discontinuity grating 22 the reflected energy from which is directed towards channel $C_2$ of the same coupler 52. This channel in turn supplies the input $A_3$ of the coupler 53 which, through its output channels $B_3$ and $D_3$, directs the acoustic wave towards the third grating 23 of discontinuities. The energy reflected by this grating is finally directed towards the channel $C_3$ of the coupler 53 and picked up by the output transducer 4.

Absorptive loads 61 and 62, identical to that 6 of FIG. 1 are arranged at the two ends of the substrate.

Thus, the delay introduced into the waves, propagated by such a delay line, is equal to the sum of the delays produced by each of the three combined elementary lines.

It is not merely lengthened because, for a wave of a given frequency, it is multiplied by three in relation to the delay which would be obtained with a single dispersive grating, but in addition the differentiation of the delay as a function of the wave frequency is increased. In other words, the gratings 21, 22 and 23 are all arranged in the same fashion in relation to the incident waves which, in the three gratings, first of all encounter the discontinuities which are closest together. Thus, the three gratings act in the same sense to differentiate the delays in the waves which they reflect.

Here, again, as in the case of FIG. 1, the three gratings 21, 22 and 23 can be reversed, the closely spaced discontinuities then being located nearer the three corresponding couplers 51, 52 and 53, than the wider spaced discontinuities.

The creation of this kind of long delay structure is the simpler if all the discontinuities it incorporates are parallel with one another.

It will be clear that the delay introduced by the line can be still further lengthened by combining with still more dispersive gratings coupled to the preceeding ones by a corresponding number of 3 dB couplers, the output transducer 4 being located after the last coupler.

It is also possible to modify the structure of FIG. 2 by replacing the dispersive grating 22 by a non-dispersive reflector device reflecting surface waves, for example the reflectors represented in FIG. 18 of French Pat. No. 72.15968 hereinbefore referred to. It is described in this patent, in relation to FIG. 19 in particular, how the assembly of two such U-shaped reflectors with a 3 dB coupler, constitutes a channel-changing reflector device; it is a device of this kind which is utilised in our invention in order, for example, to create the surface wave device of FIG. 3 where the two non-dispersive reflectors 33 and 34 replace the dispersive grating 22 of FIG. 2.

The simple substitution of this non-dispersive reflector for the dispersive grating, although it has not been illustrated here, makes it possible to achieve a dispersive line of long delay, which uses only two dispersive gratings instead of three.

Figure 3:
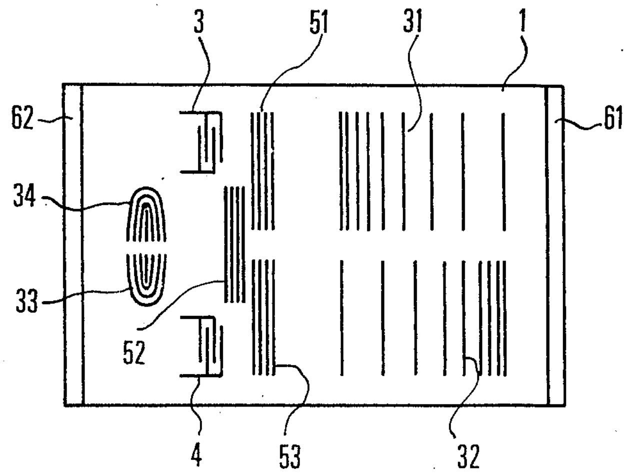
FIG. 3 is a schematic plan view of a variant embodiment which makes it possible to create a band-pass filter.

FIG. 3 illustrates another device in accordance with the invention, which constitutes a band-pass filter. In other words, in this figure the two dispersive gratings 31 and 32 are reversed in relation to one another so that the differences in delay introduced by the first, 31, into the waves of different frequencies, are compensated by the grating 32, and so that the waves picked up by the output transducer 4 all have the same delay.

What is claimed is:

1. A surface acoustic wave device comprising a piezo-electric substrate for propagating acoustic waves, an input transducer for converting high frequency electrical waves into acoustic waves for propagating at the surface of said substrate, at least one dispersive grating of non-uniformly spaced discontinuities, and an output transducer for converting the acoustic waves when reflected by said grating, into electrical waves, said grating (2) discontinuities being disposed perpendicularly to the direction of propagation of said acoustic waves, said device further comprising at least one 3 dB coupler (5) of the type having regularly spaced parallel conductive strips arranged between said input (3) and output (4) transducers and said dispersive grating (2), said conductive strips of said coupler (5) being parallel to said discontinuities of said grating (2).

2. A device according to claim 1, wherein said discontinuities of said dispersive grating (2) are mechanical discontinuities constituted by bands engraved at the surface of the piezo-electric material acting as the propagation medium for the acoustic waves.

3. A device according to claim 1, wherein said discontinuities of said dispersive grating (2) are electrical discontinuities constituted by conductive strips arranged on the surface of the piezo-electric material serving as the propagation medium for the acoustic waves and wherein said grating is in two parts, said conductive strips being interrupted at their centres.

4. A device according to claim 1 for constituting a dispersive delay line, comprising one dispersive grating (2) and one 3 dB coupler (5).

5. A device according to claim 1, comprising several dispersive gratings coupled by 3 dB couplers, arranged between the input transducer (3) and the output transducer (4), in the path of the acoustic waves when propagating, said acoustic waves, when delivered by said input transducer (3) successively passing through said dispersive gratings before being picked up by said output transducer (4).

6. A device according to claim 5, for constituting a dispersive delay line, comprising the same number of dispersive gratings (21, 22, 23) and of 3 dB couplers (51, 52, 53), said dispersive gratings all being arranged in the same fashion in relation to the 3 dB couplers for supplying them with the acoustic wave, so that each of said dispersive gratings delays in the same way the waves of different frequency which it reflects when operating.

7. A device according to claim 5, for constituting a band-pass filter, comprising an even number of said dispersive gratings (31, 32) each associated with a 3 dB coupler (51, 52), two gratings of a pair being reversed in relation to one another so that the delay differences introduced by one of them into the acoustic waves of different frequencies which it reflects, when operating, are compensated by the other, the two said 3 dB couplers combined with said dispersive gratings of a pair, themselves being coupled by a third 3 dB coupler (52) with which there is associated a non-dispersive surface wave reflector (33, 34).

* * * * *